United States Patent [19]

Sakurada et al.

[11] 4,288,154

[45] Sep. 8, 1981

[54] DIGITAL INFORMATION INDICATING SYSTEM

[75] Inventors: Nobuaki Sakurada, Kanagawa; Nobuhiko Shinoda; Yukio Mashimo, both of Tokyo; Tadashi Ito; Fumio Ito, both of Kanagawa, all of Japan

[73] Assignee: Canon Kabushiki Kaisha, Tokyo, Japan

[21] Appl. No.: 35,211

[22] Filed: May 2, 1979

Related U.S. Application Data

[63] Continuation of Ser. No. 850,806, Nov. 11, 1977, abandoned, which is a continuation of Ser. No. 610,276, Sep. 4, 1975, abandoned.

[30] Foreign Application Priority Data

Sep. 4, 1974 [JP] Japan ............................ 49/101710

[51] Int. Cl.³ ................... G03B 17/18; G01J 1/44
[52] U.S. Cl. .................... 354/23 D; 354/60 L; 354/60 A; 356/226
[58] Field of Search .............. 354/23 D, 50, 51, 53, 354/60 R, 60 A, 60 L; 324/99 D, 78 D; 356/226

[56] References Cited

U.S. PATENT DOCUMENTS

| | | | |
|---|---|---|---|
| 3,843,249 | 10/1974 | Kitaura | 354/23 D |
| 3,879,118 | 4/1975 | Kiyohara et al. | 354/23 D |
| 3,889,278 | 6/1975 | Takahata et al. | 354/23 D |
| 3,895,875 | 7/1975 | Kitaura et al. | 354/53 |
| 3,909,137 | 9/1975 | Kisanuki | 354/23 D |
| 3,909,716 | 9/1975 | Diekers | 324/78 D |
| 3,928,858 | 12/1975 | Sakurada et al. | 354/23 D |

OTHER PUBLICATIONS

"TTL Cookbook", Don Lancaster, 1974, pp. 292-295.

Primary Examiner—L. T. Hix
Assistant Examiner—William B. Perkey
Attorney, Agent, or Firm—Toren, McGeady and Stanger

[57] ABSTRACT

The present invention refers to a system for digitally indicating the digital input information, and particularly for avoiding the flickering of the indication state of the indication means in case the input information varies. The system includes a control means for conveying the digital input information to the indication means periodically to update the content of the indication means at the end of a determined period. When input information varies excessively, it is detected and immediately conveyed to the indication means independently of the update at the end of the determined period. Accordingly, the system is quite efficient as an indication system for a continuously varying input information.

11 Claims, 9 Drawing Figures

$S = X + Y + Cin$ $d = X - Y - Bin$

DIGITAL INFORMATION INDICATING SYSTEM

This is a continuation of application Ser. No. 850,806, filed Nov. 11, 1977, now abandoned, which is a continuation of application Ser. No. 610,276, filed Sept. 4, 1975, now abandoned.

BACKGROUND OF THE INVENTION

1. Field of the Invention:

The present invention relates to an information indication system, particularly to an information indication system for digitally indicating a continuously varying output such as the output of the measured light in the case of a camera.

2. Description of the Prior Art:

The recent advance in digital techniques has made digital indication in the field of information indication more and more popular. This concept is also applied in the indication of the exposure determining factor in photography and has, to some extent, been used for indicating the photographic information of a camera.

However, photographic information for a camera is indicated only after various kinds of the photographic data have been processed, mainly based upon the quantity of the measured light. Accordingly, indication information naturally varies when some variation takes place in the information of the measured light, such as the brightness of the object to be photographed.

Thus when the indication information is indicated by means of an indication means such as a seven-segmented unit which presents a superior response to the variation of the input information, the indicated value varies in response to the above mentioned continuously varying indication information so that the photographer can not visually follow the variation of the indication value. This is so because the indication value itself varies within a very short period as to leave an after-image. Thus, visually, the indication value flickers so that it is impossible to read out the indication value.

U.S. Pat. No. 3,872,483 and DOLS No. 2,435,903 disclose systems according to which indication is made at a certain determined period by enlarging the sampling period in order to avoid the above mentioned shortcoming. These systems are provided with a light measuring circuit for measuring the brightness of the object to be photographed, and A-D converting means for converting the output of the light measuring circuit into a digital quantity, a digital indication means for indicating the output of the A-D converter and a sampling circuit for actuating the A-D converter at a certain determined period in such a manner that the output of the light measuring circuit is converted into a digital value at a certain determined period and updated at a certain determined period. Accordingly, the analog-digital conversion is not carried out continuously but only at the certain determined period. Thus, even when during the pause of the analog-digital conversion, the output of the light measuring circuit varies abruptly so as to deviate largely from the output of the light measuring circuit when the output is converted into digital value, the output converted already into digital value presents the value obtained before the large variation. Thus, in the case of system for an automatic exposure camera with digital control for determining the exposure automatically by means of the output converted into digital value, the output converted into digital value presents the former value even though, as explained above, during the pause of the analog digital conversion the output of the light measuring circuit has varied. The exposure mechanism then, does not operate in accordance with the actual value of the measured light, and fails to obtain a correct exposure. During the pause of the analog digital conversion the indication itself presents the former value and the present instantaneous value can not be indicated until the output has been converted into a digital value after the certain determined period. Further the photographer who decides the exposure himself can not learn the variation immediately when, as explained above, during the pause of the analog digital conversion the output of the measured light varies widely. To repeat, the photographer is obliged to decide the exposure in accordance with the indication value before variation, setting an incorrect exposure condition. This is again disadvantageous.

Thus, the present invention is intended to offer a digital information indication system without the above mentioned shortcoming in accordance with which system the above mentioned flickering can be avoided while a large variation of the brightness of the object to be photographed from the indicated value within the above mentioned certain determined period is immediately detected so as to update the indication. The system is composed in such a manner that the analog-digital conversion is always carried out for the continuously varying information, the timing of the indication being controlled in such a manner that the output of the A-D converter is sampled at a certain determined period during which period the variation of the indication value can visually be followed. In the case of a variation from the indicated value being more than a certain predetermined value, the indication being varied independently of the above mentioned certain determined period.

SUMMARY OF THE PRESENT INVENTION

A purpose of the present invention is to provide a digital information indication system free from the shortcoming of the conventional digital indication system.

Another purpose of the present invention is to provide a digital information indication system in accordance with which for abruptly varying information, the indication value is updated at a certain determined period while the information which deviates widely from the then indicated value is detected so as to immediately update the content of the indication independently of the update of the indication at the certain determined period.

Another purpose of the present invention is to provide a digital information indication system quite suitable as the digital information indication system for a camera.

Other further purposes of the present invention will be disclosed from the detailed explanation to be made below in accordance with the accompanying drawings.

DESCRIPTION OF THE EMBODIMENTS OF THE INVENTION

Figure 1:
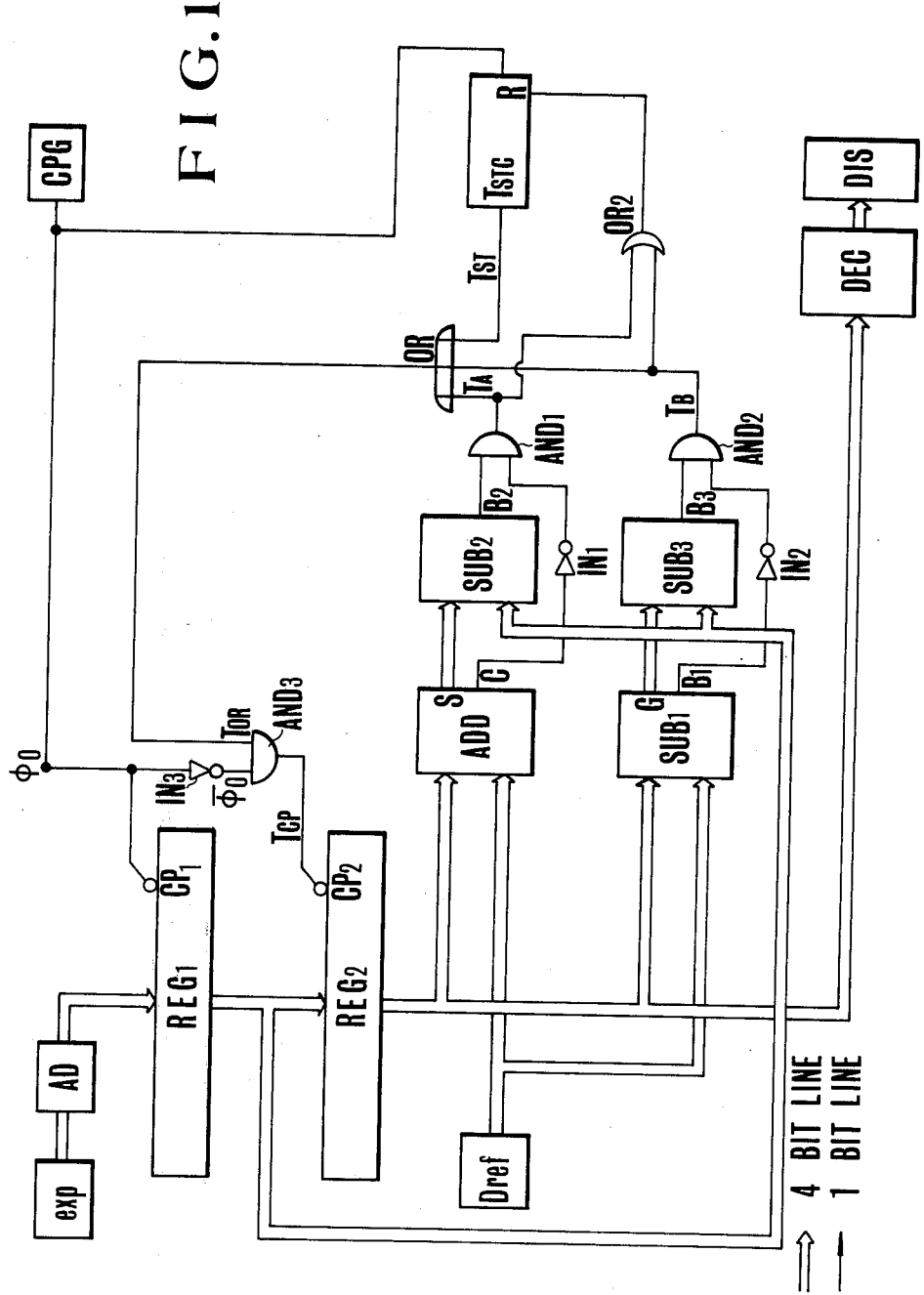
FIG. 1 shows a block diagram of an embodiment of the digital information indicating system in accordance with the present information.

FIG. 1 shows a block diagram of an embodiment of the digital information indicating system in accordance with the present invention, wherein the block "exp" is a conventional light measuring circuit consisting of a photovoltaic element, processing amplifiers and so on, designed so as to receive the light beam from the object to be photographed in such a manner that the circuit produces an analog electric quantity corresponding to the intensity of the light beam of the object to be photographed. AD is an analog-digital converting device for converting the analog electric quantity produced by exp. into a digital quantity. $REG_1$ is the first register for storing the digital information (of 4 bits) coming from the above mentioned A-D converting device AD in parallel fashion, being synchronized with the trailing edge of the clock pulses $\phi_o$ coming from the pulse generating circuit CPG for producing clock pulses with a certain determined period. $REG_2$ is the second register for storing the content of the above mentioned first register $REG_1$, being synchronized with the trailing edge of a pulse at the terminal $CP_2$. DEC is a decoder for decoding the output of the above mentioned second register $REG_2$ for indication. DIS is an indication device for digitally indicating the digital information stored in the above mentioned second register in accordance with the output of the above mentioned decoder. Dref is the constant value setting circuit for producing a certain predetermined digital constant of 4 bits as a fluctuation tolerance value of the information not necessary, for correction for indication. ADD is the full adder means for producing the summation of the content of the above mentioned second register $REG_2$ with the above mentioned digital constant at the terminal S. $SUB_1$ is the full subtractor means for subtracting the above mentioned constant value from the above mentioned second register $REG_2$ so as to produce the result at the terminal G. $SUB_2$ is the full subtractor means for subtracting the content of the first register 1 from the output information at the terminal S of the above mentioned full adder means ADD so as to produce a high level output at the terminal $B_2$ when, after subtraction, a borrow output takes place. $SUB_3$ is the full subtractor means for subtracting the output information appearing at the terminal G of the above mentioned full subtraction means $SUB_1$ from the content of the above mentioned first register $REG_1$ so as to produce a high level output at the terminal $B_3$ when, after subtraction, a borrow output takes place. $AND_1$ is the AND-gate into which the output at the carrier output appearing terminal C of the above mentioned full adder means through the inverter $IN_1$ and the output appearing at the borrow output terminal $B_2$ of the above mentioned full subtractor means $SUB_2$ are supplied. $AND_2$ is the AND gate into which the output appearing at the borrow output terminal $B_2$ of the above mentioned full subtractor means $SUB_1$ through the inverter $IN_2$ and the output appearing at the borrow output terminal $B_3$ of the above mentioned full subtractor means $SUB_3$ are supplied. OR is the OR-gate into which the output of the above mentioned AND-gate $AND_1$, that of the above mentioned AND-gate $AND_2$, and the indication information updating pulse $T_{ST}$ produced by the dividing circuit for dividing the pulse produced by the above mentioned pulse generating circuit CPG are supplied. $AND_3$ is the AND-gate into which the output $T_{OR}$ of the above mentioned OR-gate and the pulse $\phi_o$ obtained from the clock pulse go through the inverter $IN_3$ are supplied and whose output is, in turn, supplied into the terminal $CP_2$ of the second register $REG_2$. $OR_2$ is connected with the output terminal of the above mentioned AND-gate $AND_1$ and that of the above mentioned AND-gate $AND_2$. The output of $OR_2$ is connected with the reset input terminal of the above mentioned dividing circuit $T_{STC}$ in such a manner that the dividing circuit $T_{STC}$ is reset by means of the output of $OR_2$.

Figure 2:
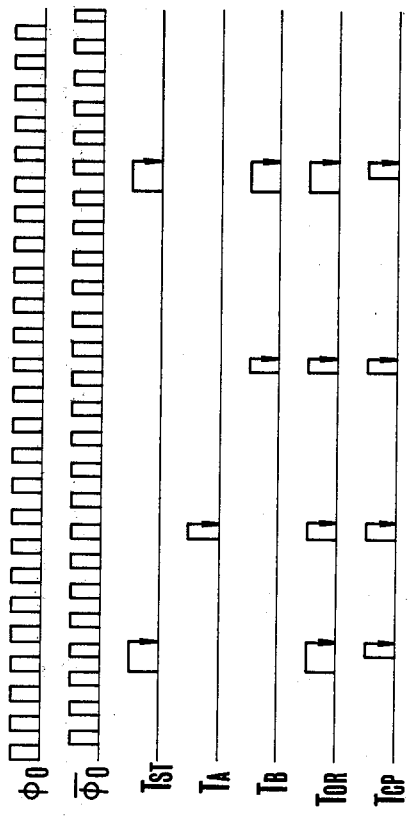
FIG. 2 shows time charts for explaining the operation of the embodiment of FIG. 1.

Below the operation of the embodiment described above will be explained in accordance with the timing charts of FIG. 2.

The continuously varying brightness of the object to be photographed is converted into an analog electric quantity corresponding to the brightness of the object to be photographed by means of the light measuring circuit exp. The analog electric quantity is then converted into digital information by means of an analog-digital converting means AD. Because the digital information converted by the above mentioned AD corresponds to the above mentioned brightness of the object to be photographed, its value varies continuously corresponding to the brightness of the object to be photographed. The digital information is supplied to the input terminal of the first register $REG_1$ in such a manner that the information is stored in the first register $REG_1$, being synchronized with the trailing edge of the timing pulse $\phi_o$ supplied to the terminal $CP_1$. $\phi_o$ has a very short period and comes from the pulse generating circuit CPG. Because the storing operation of the digital information coming from the above mentioned AD into the register $REG_1$ is carried out every time the above mentioned pulse $\phi_o$ is supplied, the continuously varying digital information is stored in the register $REG_1$, being synchronized with the pulse $\phi_o$. Since the pulse $\phi_o$ is supplied to the register $REG_1$ with a very short period the digital information almost corresponding to the actual variation of the brightness of the object to be photographed enters the register $REG_1$. The digital information stored in the register $REG_1$ is supplied to the register $REG_2$ and then to the indication means DIS through a decoder DEC in order to be digitally indicated. The storing operation of the information from the register $REG_1$ into the register $REG_2$ is carried out every time, the pulse $T_{CP}$ is supplied to the terminal $CP_2$. Accordingly, the above mentioned pulse $T_{CP}$ is supplied to the terminal $CP_2$ of the register $REG_2$, the information corresponding to the brightness of the object to be photographed, being stored in the register $REG_1$ with a very short period, is not supplied to the register $REG_2$. Thus, the indication means DIS would still indicates the content stored in the register $REG_2$ by means of the preceeding pulse $T_{CP}$. The above mentioned pulse $T_{CP}$ is the pulse obtained by the pulse signal through the OR-gate of the data updating pulse $T_{ST}$ produced by the dividing circuit $T_{STC}$ with a very long period compared with the period of the above mentioned $\phi_o$ and by the AND logic through the AND gate AND$_3$, of the above mentioned pulse T$_{ST}$ and of the inverted pulse $\overline{\phi_o}$ of the above mentioned timing pulse $\phi_o$ through the inverter IN$_3$. Accordingly, the pulse T$_{CP}$ substantially possesses the same period as the above mentioned pulse T$_{ST}$ and therefore the information of the register REG$_1$ is stored in the register REG$_2$ at a longer interval compared with the period of the pulse $\phi_o$. Thus, the indication made by the indicating means DIS is updated in its content with the period of the pulse T$_{SC}$ of the dividing circuit. Therefore, even if the brightness of the object to be photographed always varies continuously, the content of the register REG$_1$ is stored in the register REG$_2$, being synchronized with the pulse T$_{SC}$ of the above mentioned dividing circuit T$_{SC}$. The content of the register REG$_2$ does not vary until the next storing pulse T$_{CP}$ is supplied to CP$_2$, and during the period of the pulse T$_{SC}$. The indication, therefore, does not vary during the period of the above mentioned pulse T$_{SC}$ so that the flickering of the indication due to the variation of the brightness of the object to be photographed can be avoided even if the output AD varies with a very short period due to the variation of the brightness of the object to be photographed. During a series of the above mentioned processes, the content of the second register REG$_2$ is supplied to the full adder means ADD and the full subtractor means SUB$_1$ at the same time. Now, assume that the data produced by the second register REG$_2$ is X. A constant value $\alpha$, as the variation tolerance value is put in the above mentioned addition means ADD and the above mentioned subtraction means SUB$_1$ from the constant value setting circuit Dref. The arrangement is so designed that the above mentioned adder means ADD carries out the addition of the constant $\alpha$ to the data X produced by the second register REG$_2$, so as to produce the result X+$\alpha$ at the terminal S. The above mentioned full subtractor means SUB$_1$ carries out the subtraction of the constant $\alpha$ from the data X produced by the second register REG$_2$, so as to produce the result X−$\alpha$ at the terminal G. If result X+$\alpha$ is so much more than the capacity of the above mentioned full adder means ADD to produce a carry, the full adder means ADD produces a high level output at the terminal C. If the result X−$\alpha$ becomes so negative so as to produce a borrow output, the full subtractor means SUB produces a high level output at the B$_1$. The output X+$\alpha$ at the terminal S of the full adder means ADD is entered into the full subtractor means SUB$_2$, in which the content X' of the first register REG$_1$, representing the then brightness of the object to be photographed is also supplied at the same time. The subtraction of the data X' from the data X+$\alpha$ occurs, so that when the result X+$\alpha$−X' is negative, the borrow output terminal B$_2$ of the full subtractor means SUB$_2$ produces a high level output. This high level output means that X+$\alpha$−X' is smaller than 0 or X'−X is larger than $\alpha$. That is, the variation of the content X' of the first register REG$_1$ representing the instantaneous brightness in comparison to the content X of the second register REG$_2$ representing the brightness at the preceeding sampling is larger than the variation tolerance value. Thus, the output produced at the terminal B$_2$ of the total subtraction means SUB$_2$ is supplied to the AND-gate AND$_1$. In the above mentioned AND-gate AND$_1$ the output produced at the carrier output terminal C of the above mentioned addition means ADD is entered through the inverter IN$_1$, whereby so long as the output produced at the above mentioned carrier output terminal C is at the low level, the above mentioned AND-gate AND$_1$ is kept open so that in case a high level borrow output is produced at the terminal B$_2$ of the above mentioned total subtraction means SUB$_2$, the AND-gate AND$_1$ produces a high level signal T$_A$. This is supplied to the AND-gate AND$_3$ through the OR-gate OR. In consequence the output is supplied to the terminal CP$_2$ of the second register REG$_2$ as the pulse T$_{CP}$ obtained as the AND-logic of the pulse and the inverted pulse $\overline{\phi_0}$ of the timing pulse $\phi_0$, when the data X' stored in the first register REG$_1$ is stored in the second register REG$_2$, at the same time varying the indication of the indication means DIS into X'. When the then brightness of the object to be photographed is higher than that at the time when it was stored in the above mentioned second register REG$_2$ by means of the preceeding pulse T$_{CP}$ beyond the certain determined tolerance, the content of the above mentioned register REG$_2$ is updated and immediately indicated independently of the updated pulse T$_{ST}$ produced by the above mentioned dividing circuit T$_{STC}$ at a certain determined period. Further, the output X−$\alpha$ produced at the terminal G of the above mentioned subtraction means SUB$_1$ is supplied to the total subtraction means SUB$_3$, whereby at the same time, the content X' of the first register REG$_1$ is supplied to the above mentioned full subtractor means SUB$_3$. Here, the subtraction of the data X−$\alpha$ from the data X' is carried out in such a manner that, when the result X'−X+$\alpha$ is negative, a high level output is produced at the borrow output terminal B$_3$ of the full subtractor means SUB$_3$. This high level output means that the result X'−X+$\alpha$ is smaller than 0, namely, X−X$^1$ is larger than $\alpha$. In other words, the variation of the content X of the first register REG$_1$ in contrast to the content X of the second register REG$_2$, namely, the instantaneous indicated information, is larger than the variation tolerance value $\alpha$. Under these circumstances output produced at the terminal B$_3$ of the full subtractor means SUB$_3$ is supplied to the AND-gate AND$_2$. Because the above mentioned AND-gate AND$_2$ is kept opened so long as the output produced at the borrow output terminal B$_1$ of the above mentioned full subtractor means SUB$_1$ is at a low level, when a high level borrow output is produced at the terminal B$_3$ of the above mentioned full subtractor means SUB$_2$, a high level signal T$_B$ is produced by the AND-gate AND$_2$ and is entered in the AND-gate AND$_3$ through the OR-gate OR. In consequence, the output is supplied to the terminal CP$_2$ of the above mentioned second register REG$_2$ as the pulse T$_{CP}$ obtained as the AND logic of the output and the inversed pulse $\overline{\phi_0}$ of the timing pulse $\phi_0$, when the data X' stored in the first register REG$_1$ is stored in the second register REG$_2$, at the same time varying the indication by the indication means DIS into X'.

In other words, when the variation of the data X' stored in the first register REG$_1$, synchronized by the trailing edge of the timing pulse $\phi_o$ from the information X stored in the second register REG$_2$ and indicated by the indication means DIS, is within the range of $\pm\alpha$, the content X' of the first register REG$_1$ is stored in the second register REG$_2$ synchronized by the trailing edge of the data updating pulse T$_{ST}$ so as to update the indication. The content X' of the first register REG$_1$ is stored in the second register REG$_2$ so as to renovate the indication at the time when it is determined that the variation of the data X' stored in the first register REG$_1$ from the indicated information X is without the range of $\mp\alpha$.

Thus, when a borrow output $T_A$ or $T_B$ is produced by the full subtractor means $SUB_2$ or $SUB_3$, it is detected by the OR-circuit $OR_2$, resetting the dividing circuit $T_{STC}$ in such a manner that the timing of producing the next pulse $T_{ST}$ is determined starting from the time point when $T_A$ or $T_B$ is produced. Accordingly, the situation can be avoided that immediately after the indication is updated by the borrow output $T_A$ or $T_B$ the data updating pulse $T_{ST}$ is produced and the indication must immediately be updated.

Figure 3:
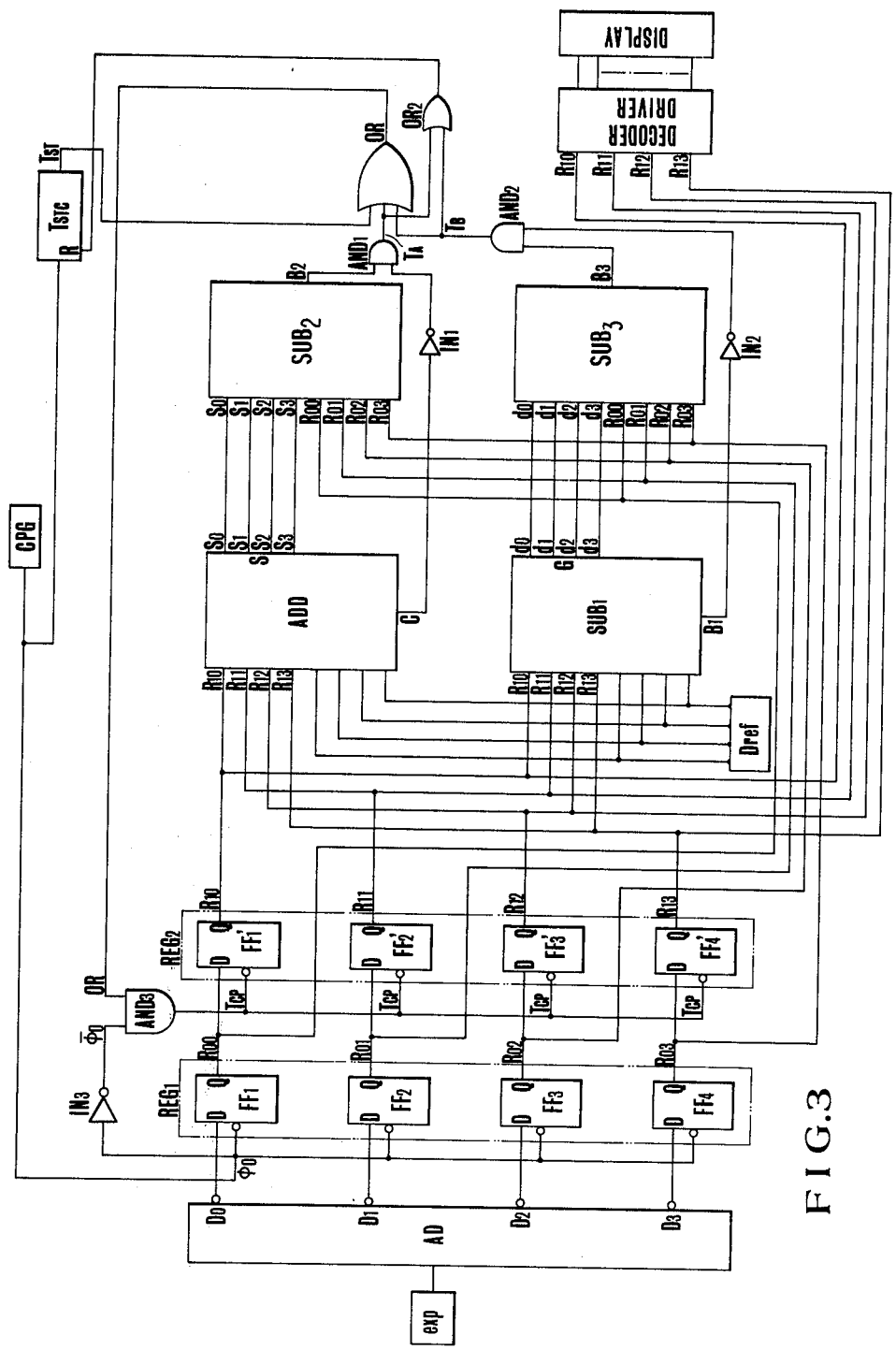
FIG. 3 shows a circuit diagram for showing a concrete circuit arrangement of the embodiment of FIG. 1.
Figure 4A:
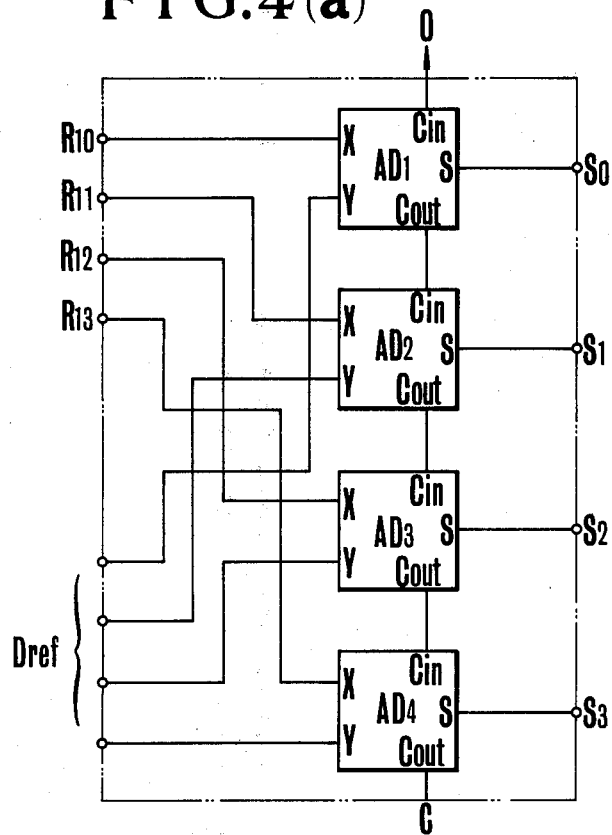
FIGS. 4(a) and 4(b) show logic diagrams of the circuit diagram of the fuller adder means ADD of FIG. 3.
Figure 4B:
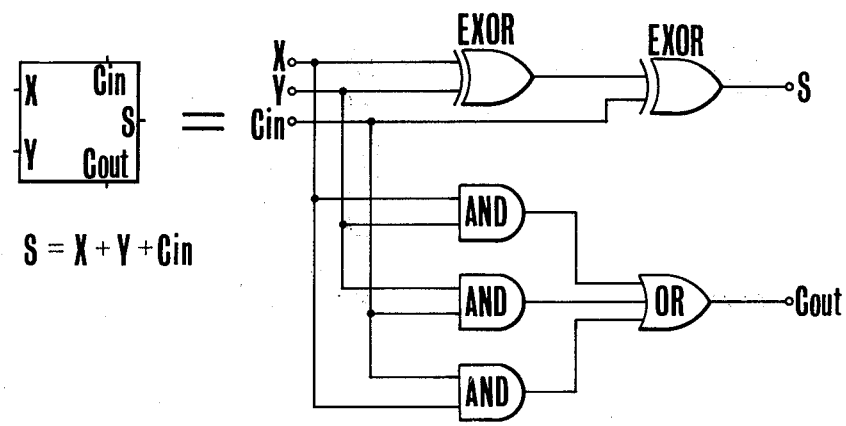
Figure 5A:
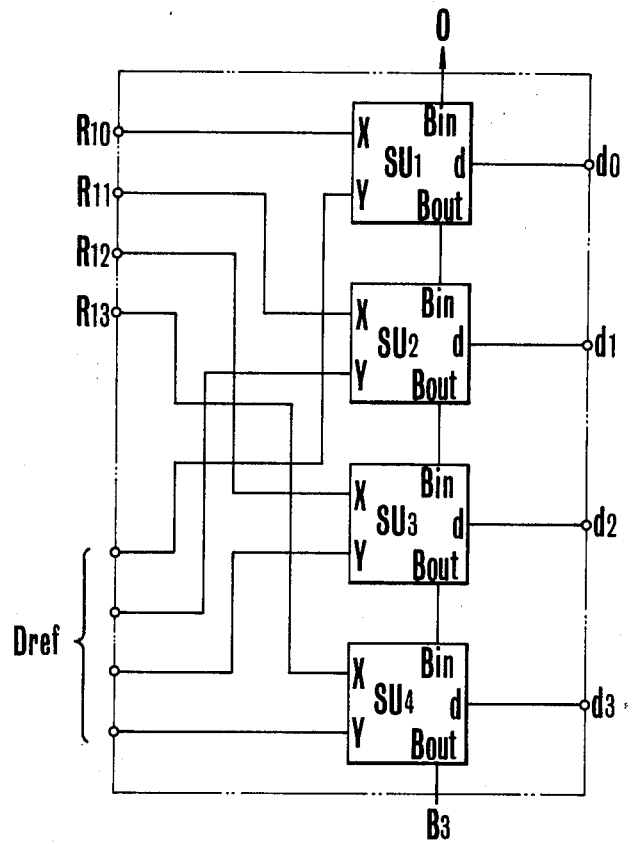
FIGS. 5(a) and 5(b) show logic diagrams of the circuit diagram of the full subtractor means $SUB_1$ of FIG. 3.
Figure 5B:
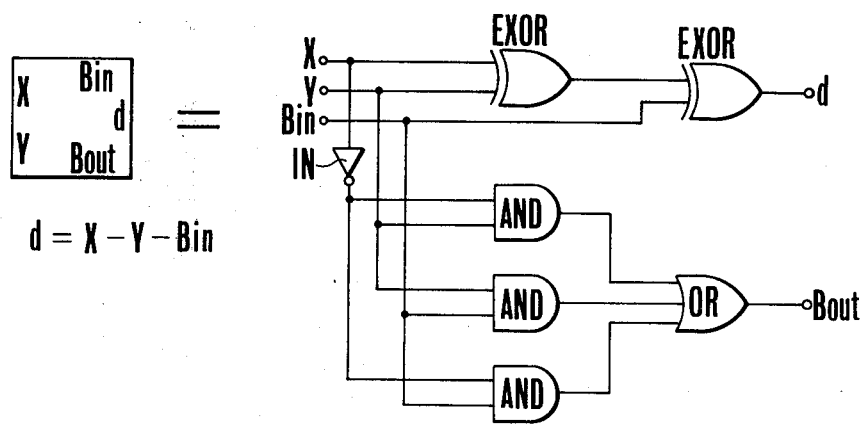
Figure 6:
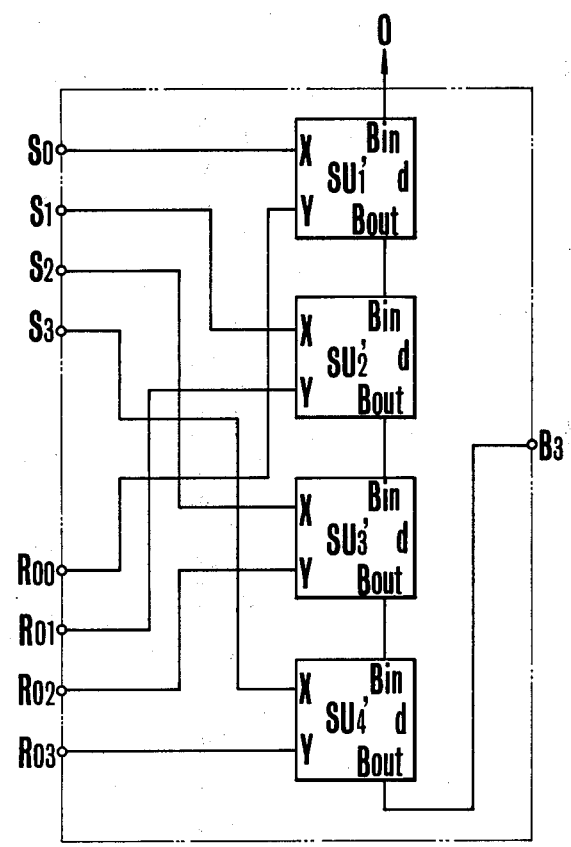
FIG. 6 shows logic diagrams of the circuit diagram of the full subtractor means $SUB_2$ of FIG. 3.
Figure 7:
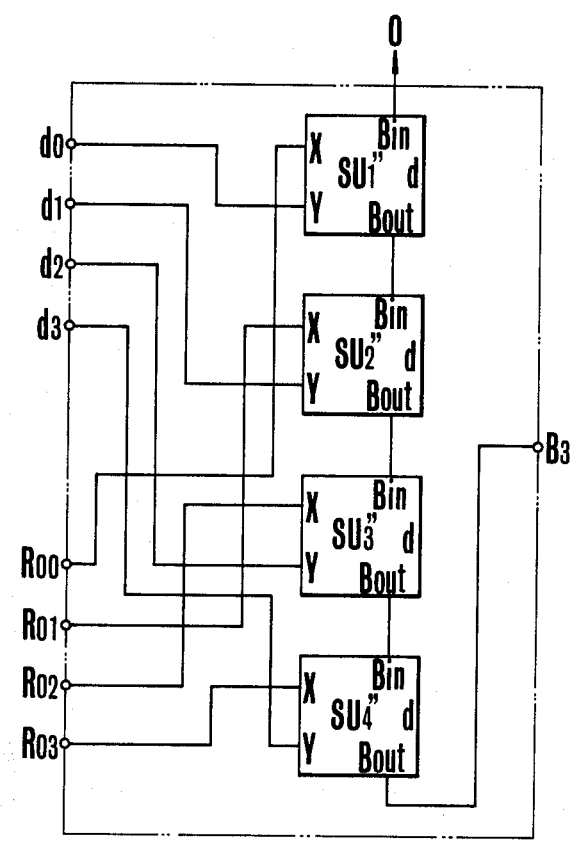
FIG. 7 shows logic diagrams of the circuit diagram of the full subtractor means $SUB_3$ of FIG. 3.

FIG. 3 shows the circuit diagram for showing the details of the block diagram shown in FIG. 1. In FIG. 3, the same components as those shown in FIG. 1 present the same figures. Below, the embodiment will be explained in accordance with FIG. 3. exp. and AD are the light measuring circuit and the A-D converting means shown in FIG. 1. The above mentioned $REG_1$ consists of Flip-Flops $FF_1$-$FF_4$ here, the input terminal of each Flip-Flop being connected with respective output terminal $D_o$-$D_3$, representing a respective bit of the A-D converting means A-D and at the same time, with the pulse generating circuit CPG for generating the clock pulse for storing the output of AD. This is done in such a manner that the content of each Flip-Flop is produced by AD, being synchronized with the pulse $\phi_o$. Similarly to $REG_1$, $REG_2$ consists of Flip-Flops $FF_1'$-$FF_4'$, whereby the input of each Flip-Flop is connected with the respective output of the above mentioned Flip-Flops $FF_1'$-$FF_4'$ in such a manner that the content of each Flip-Flop $FF_1'$-$FF_4'$ is stored in the respective Flip-Flop $FF_1'$-$FF_4'$ by means of the signal $T_{CP}$ coming from the above mentioned $AND_3$. Each output $R_{10}$-$R_{13}$ of the above mentioned Flip-Flop $FF_1'$-$FF_4'$ is put in the above mentioned addition means ADD and the above mentioned subtractor means $SUB_1$. A constant supplied to ADD from the above mentioned Dref is added to the respective output in ADD or a constant supplied to $SUB_1$ from the above mentioned Dref is deducted from the respective output in $SUB_1$. The output $S_o$-$S_3$ of the above mentioned ADD is supplied to the above mentioned $SUB_2$ so as to be deducted from the output $R_{oo}$-$R_{o3}$ put in the above mentioned $SUB_2$, of the above mentioned $REG_1$. This is done in such a manner than $B_2$ produces a borrow output when the result of the subtraction is negative. Further, the output $d_o$-$d_3$ of the above mentioned $SUB_1$ is supplied to the above mentioned $SUB_3$ so as to be deducted from the output $R_{oo}$-$R_{o3}$ of the above mentioned Flip-Flop $FF_1$-$FF_4$ in $SUB_3$. This is done in such a manner that $B_3$ produces a borrow output when the result of the subtraction is negative. The operation of the embodiment shown in FIG. 3 is the same as that of the embodiment shown in FIG. 1, so that its explanation is omitted. The full adder means ADD shown in FIG. 3 consists of adder means $AD_1$-$AD_4$, each consisting of the exclusive OR-gate EXOR, the AND-gate AND and the OR-gate OR for each bit as is shown in FIGS. 4a and 4b. The output $R_{10}$-$R_{13}$ of the Flip-Flop $FF_1'$-$FF_4'$ of the above mentioned second register $REG_2$ and the output of Dref is applied to the respective input terminal of the addition means $AD_1$-$AD_4$. Further, the full subtractor means $SUB_1$ consists of the subtractor means $SU_1$-$SU_4$, each consisting of the exclusive OR-gate EXOR, the AND-gate AND, the OR-gate OR and the inverter IN for each bit as is shown in FIGS. 5a and 5b. Further, as to the composition of the total addition means $SUB_2$ shown in FIG. 3, the subtraction means $SU_1'$-$SU_4'$ is provided for each bit as is shown in FIG. 6. whereby the output $S_o$-$S_3$ of the above mentioned addition means ADD and the output $R_{oo}$-$R_{o3}$ of the register $REG_1$ are supplied to the respective input terminal of the subtraction means $SU_1'$-$SU_4'$. Each subtraction means consists of the logic shown in FIG. 5b. Further as to the composition of the full subtractor means $SUB_3$, the subtractor means $SU_1''$-$SU_4''$ is provided for each bit as is shown in FIG. 7, whereby the output $d_o$-$d_3$ of the subtraction means $SU_1$-$SU_4$ of the above mentioned $SUB_1$ and the output $R_{oo}$-$R_{o3}$ of the above mentioned register $REG_1$ are supplied to the input terminal of the respective subtraction means. Each subtractor means consists of the logic shown in FIG. 5b.

As explained above in detail, by means of the digital information indicating system in accordance with the present invention, the digital information in which a continuously varying analog quantity is converted is sampled at a certain determined period and indicated. When, however the analog quantity varies excessively from the sampled information, the variation is detected. The information is then immediately indicated independently of the sampling period. Accordingly, the system is very useful for indicating information which varies quite often, such as the digital indication of the photographing information for a camera.

What is claimed is:
1. A device for indicating photographic exposure information in digital form, comprising:
    (a) a conversion means for converting analog exposure information corresponding to an object brightness into a digital value;
    (b) a first register means to read out and memorize the output of said brightness information converting means;
    (c) a second register means coupled to said first register means, said second register means for memorizing the content of the first register means;
    (d) an indication circuit to provide an indication corresponding to the content of the second register means;
    (e) a transmit signal forming circuit for generating periodically a signal for transmitting content of the first register means to the second register means, the periodically generated signals being produced with a period necessary for visually recognizing the display value when the content of the second register means is indicated by means of the indication circuit, so that the content of the second register means is renewed periodically into a value corresponding to the brightness; and
    (f) a control circuit connected to the first register means and the second register means, which forms a signal for transmitting the content of the first register means to the second register means independently of the transmit signal formed by the transmit signal forming circuit when the difference between the contents of the first and second register means exceeds a prescribed value, whereby the content of the second register means is renewed immediately when the brightness of the object changes sharply with the formation of the transmit signal.

2. A device for indicating photographic exposure information in digital form, comprising:
    (a) a conversion means to convert analog exposure information corresponding to an object brightness into a digital value;

(b) a first register means to read out and memorize the output of said brightness information converting means;

(c) a second register means coupled to said first register means;

(d) an indication circuit connected to said second register means to indicate the content of the second register means;

(e) a transmit signal forming circuit for producing a transmit signal for transmitting the content of the first register means into said second register means at a certain determined period, said certain determined period being a period longer than that necessary for visually recognizing the display value;

(f) a control circuit which forms a transmit signal for transmitting the content of the first register means to the second register means independently of the transmit signal formed by the transmit signal forming circuit; said circuit comprising:

(1) a constant value memorizing means to memorize a digital value corresponding to a predetermined constant value; and (2) a determining means coupled to said first register means, said second register means and said constant memorizing means for determining whether or not the difference between the content of the first register means and that of the second register means is within a predetermined value of the constant value memorizing means, wherein said determining means provides said transmit signal when said value of difference exceeds said predetermined value.

3. A device for indicating digital exposure information, comprising:

(a) a conversion means to convert analog exposure information corresponding to an object brightness into a digital value;

(b) a first register means to read out and memorize the output of said brightness information converting means;

(c) a second register means coupled to said first register means;

(d) an indication means coupled to said second register means to indicate the content of the second register means;

(e) a transmit signal forming circuit for producing a transmit signal for transmitting the content of said first register means into said second register means at a certain determined period, said certain determined period being a period longer than that necessary for visually recognizing the display value;

(f) a constant value memorizing means for providing a digital value corresponding to a predetermined constant value memorized therein;

(g) a threshold value forming means coupled to said second register means and said constant memorizing means for forming a predetermined upper limit value and a predetermined lower limit value based on the content of said second register means and the content of said constant value memorizing means;

(h) a comparison circuit coupled to said first register means and said threshold value forming means to compare the content of the first register means with said upper limit value and lower limit value and for generating an output when the value of the content of the first register means is either above the upper limit value or below the lower limit value; and (i) a transmitting means coupled to said second register means for transmitting the content of the first register means to the second register means in response to the output of the comparison means independent of said transmit signal.

4. A device for indicating photographic exposure information in digital form, comprising:

(a) a conversion means to convert analog exposure information corresponding to an object brightness into a digital value;

(b) a first register means to read out and memorize the output of said brightness information converting means;

(c) a second register means coupled to said first register means;

(d) an indication means coupled to said second register means for indicating the content of the second register means;

(e) a transmit signal forming circuit for producing a transmit signal for transmitting the content of said first register means into said second register means at a certain determined period, said certain determined period being a period longer than that necessary for visually recognizing the display value;

(f) a constant value memorizing means for providing a digital value corresponding to a predetermined constant value memorized therein;

(g) an adder means connected to said second register means and said constant memorizing means to add together the content of the second register means and the content of the constant value memorizing means;

(h) a subtraction means connected to said second register means and said constant value memorizing means to subtract the content of the constant memorizing means from the content of the second register means;

(i) a first comparison means coupled to said first register means and said adder mens for generating an output when the content of the first register means has a greater value than that of the output of the adder means;

(j) a second comparison means coupled to said first register means and said subtraction means for generating an output when the content of the first register means has a smaller value than that of the output of the subtraction means; and (k) a transmission means to transmit the content of said first register to the second register in response to the output of said first and second comparison means independent of said transmit signal from said transmit signal forming circuit.

5. A device according to claim 4, in which the first comparison means is a subtraction circuit to subtract the output value of the adder means from the output value of the analog-digital conversion means for generating a borrow output when the output value of the adder means is smaller than the output value of the analog-digital conversion means.

6. A device according to claim 4, in which the second comparison means is a subtraction circuit to subtract the output value of the above-mentioned subtraction means from the output value of the analog-digital conversion means for generating a borrow output when the output value of the analog-digital conversion value is smaller than that of the subtraction means.

7. A device for indicating photographic exposure information in digital form, comprising:
   (a) a light measuring circuit for providing an analog signal corresponding to an object brightness;
   (b) an analog-digital conversion means connected to said light measuring circuit for converting the analog value thereof to a digital value, wherein the value of the output of said conversion means varies corresponding to brightness;
   (c) a register means coupled to said analog-digital conversion means for memorizing the output of the analog-digital conversion means;
   (d) an indication means coupled to said register means to indicate the content thereof;
   (e) a transmit signal forming circuit for producing a transmit signal for transmitting the output of said analog-digital conversion means into said register means at a certain determined period, said certain determined period being a period necessary for visually recognizing the display value; and
   (f) a comparison means coupled to said analog-digital conversion means and to said register means, wherein the output terminal of said comparison means is coupled to the register means so that the comparison means compares the output of the analog-digital conversion means and the content of the register means and generates an output for transmitting the output of said analog-digital conversion means to said register means independent of said transmit signal when the value of difference between the output of the analog-digital conversion means and the content of the register means is greater than a predetermined constant value.

8. A device according to claim 7, in which said comparison means includes:
   (1) a constant value memorizing means for having a digital value corresponding to predetermined constant value memorized therein; and
   (2) a determining means for detecting the difference between the output of said analog-digital conversion means and the content of the register means for comparing the value of said difference with the digital value of the constant value memorized in said constant memorizing means and for generating said output when said value of difference is greater than said constant value, wherein the output terminal of said determining means is coupled to said register means.

9. A device according to claim 7, in which said comparison means includes:
   (1) a constant memorizing means for having a digital value corresponding to a predetermined constant value memorized therein;
   (2) a threshold value forming means coupled to said register means and said constant memorizing means to form a predetermined upper limit value and a predermined lower limit value based on a digital value corresponding to the content of the register means and said constant value of the constant memorizing means; and
   (3) a determining means coupled to said analog-digital conversion means and said threshold value forming means to compare the output of the analog-digital conversion means with said upper limit value and lower limit value for generating an output when the output value of the analog-digital conversion means is either above the upper limit value or below the lower limit value, wherein the output terminal of said determining means is coupled to said register means.

10. A device according to claim 9, in which said threshold value forming means includes:
   (1) an adder means coupled to said register means and said constant memorizing means to add the content of the register means and the digital value of the constant memorizing means to form said upper limit value; and
   (2) a subtraction means coupled to said register means and said constant memorizing means to subtract the digital value of the constant memorizing means from the content of the register means to form said lower limit value.

11. A device for indicating photographic exposure information comprising:
   (a) an exposure information forming means to provide an analog signal corresponding to an object brightness;
   (b) an analog-digital conversion means coupled to said exposure information for converting the analog value thereof to a digital value, wherein the value of the output of said conversion means varies corresponding to brightness;
   (c) memory means coupled to said analog-digital conversion means for memorizing the output of the analog-digital conversion means;
   (d) indication means coupled to said memory means to indicate the content thereof;
   (e) a transmit signal forming circuit for producing a transmit signal for transmitting the output of said analog-digital conversion means to said memory means at a certain determined period, said certain determined period being longer than a period necessary for visually recognizing the display value; and
   (f) a control circuit for transmitting the output of the analog-digital conversion means to said memory means independent of said transmit signal when the value difference between the output of the analog-digital conversion means and the content of content of the memory means is greater than a predetermined value,
   whereby the content of the memory means is successively and periodically renewed and, when the brightness changes beyond a predetermined value, the content of the memory means is renewed irrespective of the above periodicity.

* * * * *